US012392453B2

(12) United States Patent
Tanaka et al.

(10) Patent No.: US 12,392,453 B2
(45) Date of Patent: Aug. 19, 2025

(54) COLD RECOVERY FACILITY AND MARINE VESSEL

(71) Applicant: MITSUBISHI HEAVY INDUSTRIES, LTD., Tokyo (JP)

(72) Inventors: Toshimitsu Tanaka, Tokyo (JP); Ryo Takata, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 317 days.

(21) Appl. No.: 18/107,192

(22) Filed: Feb. 8, 2023

(65) Prior Publication Data

US 2023/0250922 A1 Aug. 10, 2023

(30) Foreign Application Priority Data

Feb. 9, 2022 (JP) ................................ 2022-018349

(51) Int. Cl.
*F17C 7/00* (2006.01)
*B63B 25/14* (2006.01)
(Continued)

(52) U.S. Cl.
CPC ................ *F17C 7/04* (2013.01); *B63B 25/14* (2013.01); *F02M 21/0224* (2013.01); *F02M 21/0209* (2013.01); *F17C 2205/0323* (2013.01); *F17C 2205/0352* (2013.01); *F17C 2221/012* (2013.01); *F17C 2221/033* (2013.01);
(Continued)

(58) Field of Classification Search
CPC ....... F17C 7/04; F17C 9/02; F17C 2227/0309
See application file for complete search history.

(56) References Cited

U.S. PATENT DOCUMENTS

| | | | | |
|---|---|---|---|---|
| 2018/0313496 A1* | 11/2018 | Garner | .................. | F17C 13/025 |
| 2019/0368426 A1* | 12/2019 | Kanei | ....................... | F02C 6/00 |
| 2022/0128195 A1* | 4/2022 | Cacciapalle | ............. | F17C 9/00 |

FOREIGN PATENT DOCUMENTS

JP 2020-147221 A 9/2020

* cited by examiner

*Primary Examiner* — Brian M King
(74) *Attorney, Agent, or Firm* — Birch, Stewart, Kolasch & Birch, LLP

(57) ABSTRACT

A cold recovery facility includes: a first fuel tank configured to store a first fuel in liquid state; a second fuel tank configured to store a second fuel in liquid state having a liquefaction temperature higher than the liquefaction temperature of the first fuel; a first circuit configured to circulate a first medium; a first expansion turbine provided on the first circuit and configured to expand the first medium in gaseous state; a first heat exchanger provided downstream of the first expansion turbine on the first circuit and configured to condense the first medium; a pump provided downstream of the first heat exchanger on the first circuit and configured to boost the first medium; a second heat exchanger provided downstream of the pump on the first circuit and configured to vaporize the first medium; and a third heat exchanger provided downstream of the second heat exchanger and upstream of the first expansion turbine on the first circuit, wherein the first heat exchanger is configured to vaporize the first fuel by heat exchange between the first fuel in liquid state from the first fuel tank and the first medium, and the third heat exchanger is configured to vaporize the second fuel by heat exchange between the second fuel in liquid state from the second fuel tank and the first medium.

10 Claims, 8 Drawing Sheets

(51) Int. Cl.
*F02M 21/02* (2006.01)
*F17C 7/04* (2006.01)
(52) U.S. Cl.
CPC ................. *F17C 2223/0153* (2013.01); *F17C 2227/0135* (2013.01); *F17C 2227/0309* (2013.01); *F17C 2227/0341* (2013.01); *F17C 2265/066* (2013.01); *F17C 2270/0105* (2013.01)

COLD RECOVERY FACILITY AND MARINE VESSEL

CROSS-REFERENCE TO RELATED APPLICATIONS

This application claims the benefit of priority to Japanese Patent Application Number 2022-018349 filed on Feb. 9, 2022. The entire contents of the above-identified application are hereby incorporated by reference.

TECHNICAL FIELD

The disclosure relates to a cold recovery facility and a marine vessel.

RELATED ART

A method for recovering and effectively utilizing cold energy of low-temperature liquid fuel such as liquefied natural gas (LNG) has been proposed.

JP 2020-147221 A discloses a floating type facility mounted with a power generation device for generating power by utilizing LNG cold heat. The power generation device includes a thermodynamic cycle using a heat medium as a working fluid and is adapted to generate electric power with a generator connected to an expansion turbine driven by a heat medium (working fluid) flowing through a circuit. In the thermodynamic cycle, engine cooling water, seawater, or the like is used as a high-temperature heat source exchanging heat with the heat medium in the evaporator, and LNG is used as a low-temperature heat source exchanging heat with the heat medium in the condenser. The LNG is vaporized (regasified) by the condenser and then supplied to an equipment or the like using natural gas as a fuel.

SUMMARY

It has been proposed that a liquid fuel, different from LNG, such as liquid hydrogen (LH2) may be used as a fuel for marine vessels, and it is considered that a plurality of liquid fuels such as LNG and liquid hydrogen may be used in combination for marine vessels or the like. Thus, when two kinds of liquid fuels are used in combination, it is desirable to recover the cold energy of the liquid fuels while efficiently vaporizing the two kinds of liquid fuels.

In view of the foregoing, it is an object of at least one embodiment of the disclosure to provide a cold recovery facility and a marine vessel capable of recovering cold energy of the liquid fuels while efficiently vaporizing two kinds of liquid fuels.

A cold recovery facility according to at least one embodiment of the disclosure includes:

a first fuel tank configured to store a first fuel in liquid state;

a second fuel tank configured to store a second fuel in liquid state having a liquefaction temperature higher than the liquefaction temperature of the first fuel;

a first circuit configured to circulate a first medium;

a first expansion turbine provided on the first circuit and configured to expand the first medium in gaseous state;

a first heat exchanger provided downstream of the first expansion turbine on the first circuit and configured to condense the first medium;

a pump provided downstream of the first heat exchanger on the first circuit and configured to boost the first medium;

a second heat exchanger provided downstream of the pump on the first circuit and configured to evaporate the first medium; and a third heat exchanger provided downstream of the second heat exchanger and upstream of the first expansion turbine on the first circuit, wherein the first heat exchanger is configured to vaporize the first fuel by heat exchange between the first fuel in liquid state from the first fuel tank and the first medium, and the third heat exchanger is configured to vaporize the second fuel by heat exchange between the second fuel in liquid state from the second fuel tank and the first medium.

A marine vessel according to at least one embodiment of the disclosure includes:

a hull;

the cold recovery facility, described above, provided in the hull; and an engine or a fuel cell using, as fuels, the first fuel vaporized in the first heat exchanger and the second fuel vaporized in the third heat exchanger.

According to at least one embodiment of the disclosure, a cold recovery facility and a marine vessel capable of recovering cold energy of the liquid fuels while efficiently vaporizing two kinds of liquid fuels, are provided.

BRIEF DESCRIPTION OF DRAWINGS

The disclosure will be described with reference to the accompanying drawings, wherein like numbers reference like elements.

DESCRIPTION OF EMBODIMENTS

Figure 1:
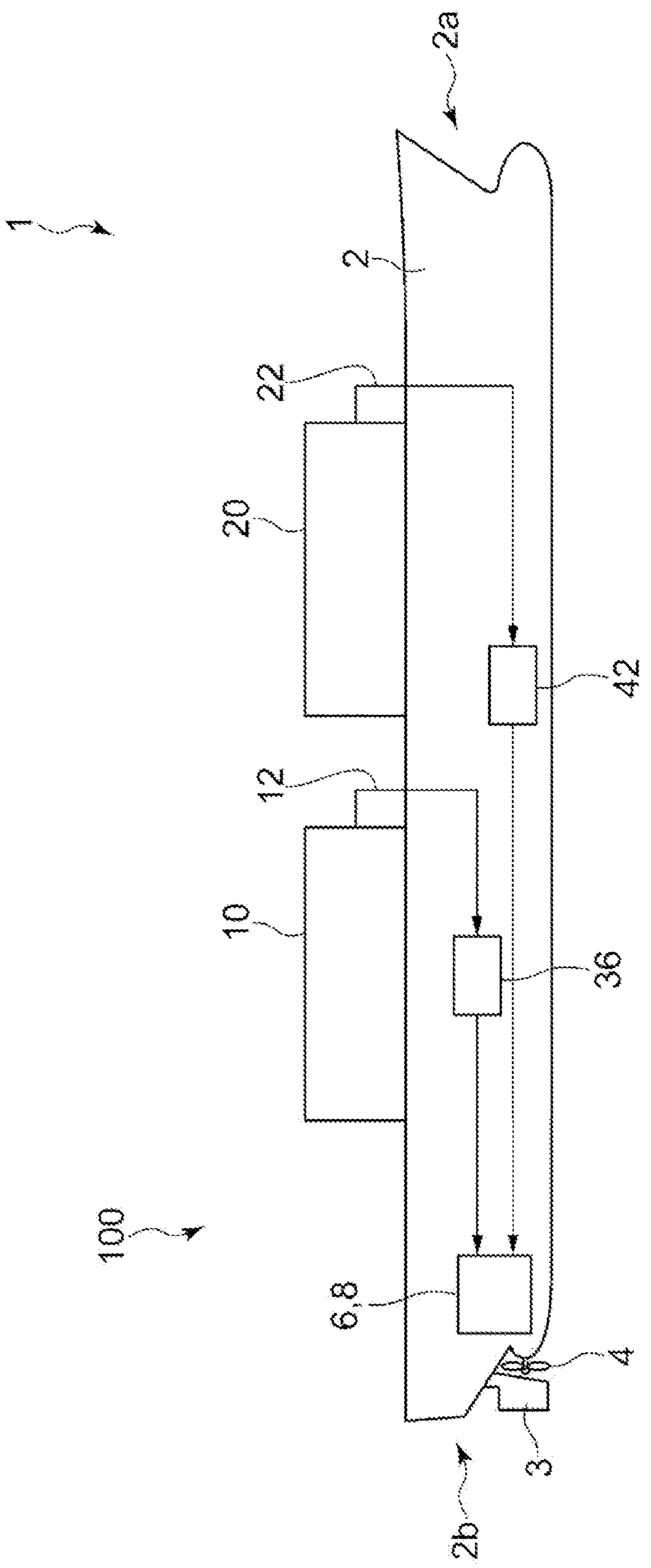
FIG. 1 is a schematic diagram of a marine vessel according to an embodiment.

Some embodiments of the disclosure will now be described with reference to the accompanying drawings. However, the dimensions, materials, shapes, relative arrangements, or the like of the components described as embodiments or illustrated in the drawings are not intended to limit the scope of the disclosure, but are merely illustrative examples.

Configuration of Marine Vessel

FIG. 1 is a schematic diagram of a marine vessel to which a cold recovery facility according to some embodiments is applied. As illustrated in FIG. 1, a marine vessel 1 includes a hull 2 (floating body), a cold recovery facility 100 including a first fuel tank 10 and a second fuel tank 20, which are provided on the hull 2, and an engine 6 provided in the hull 2.

The hull 2 includes a bow 2*a* having a shape to reduce the resistance received by the hull 2 from a fluid such as seawater, and a stern 2*b* to which a rudder 3 configured to adjust the travel direction of the hull 2 can be attached.

The engine 6 may be configured to generate motive power to drive a propeller 4 as a propeller. The engine 6 may include an engine, a turbine such as a gas turbine, or an electric motor.

As illustrated in FIG. 1, the marine vessel 1 may include a fuel cell 8. The electric power generated by the fuel cell 8 may drive the electric motor as the engine 6.

The first fuel tank 10 is configured to store a first fuel in liquid state. The second fuel tank 20 is configured to store a second fuel in liquid state. Here, the liquefaction temperature (or boiling point) of the first fuel is lower than the liquefaction temperature (or boiling point) of the second fuel (that is, the liquefaction temperature of the second fuel is higher than that of the first fuel). That is, the temperature of the first fuel in liquid state stored in the first fuel tank 10 is lower than the temperature of the second fuel in liquid state stored in the second fuel tank 20.

In some embodiments, the first fuel is hydrogen (liquefaction temperature: about −253° C.) and the second fuel is natural gas (liquefaction temperature: about −163° C.). In this case, the liquefied hydrogen (LH2) of about −253° C. is stored in the first fuel tank 10, and the liquefied natural gas (LNG) of about −163° C. is stored in the second fuel tank 20.

In the exemplary embodiment illustrated in FIG. 1, the marine vessel 1 is a marine vessel propelled with the first fuel stored in the first fuel tank 10 and the second fuel stored in the second fuel tank 20 as fuels. The cold recovery facility 100 includes a first fuel line 12 configured to direct the first fuel from the first fuel tank 10 to a supply destination, a first heat exchanger 36 provided in the first fuel line 12, a second fuel line 22 configured to direct the second fuel from the second fuel tank 20 to a supply destination, and a third heat exchanger 42 provided in the second fuel line 22, as will be described in detail below.

In the cold recovery facility 100, by heat exchange in the first heat exchanger 36, the first fuel in liquid state from the first fuel tank 10 is vaporized. By heat exchange in the third heat exchanger 42, the second fuel in liquid state from the second fuel tank 20 is vaporized. The first fuel and the second fuel, which have been vaporized to gaseous state, are heated to a suitable temperature by the heater or the like as required, and then supplied to the engine 6 (engine, gas turbine or the like) or the fuel cell 8 as fuels through the first fuel line 12 and the second fuel line 22.

The cold recovery facility according to the disclosure is not limited to that mounted on a marine vessel. The cold recovery facility according to some embodiments may be installed on water facilities other than marine vessels or may be installed on land.

Configuration of Cold Recovery Facility

Cold recovery facilities 100 according to some embodiments will be described below. FIGS. 2 to 7 are schematic diagrams of the cold recovery facilities 100, each according to one embodiment.

As illustrated in FIGS. 2 to 7, the cold recovery facilities 100 according to some embodiments each include the first fuel tank 10 configured to store the first fuel in liquid state and the second fuel tank 20 configured to store the second fuel in liquid state. As described above, the liquefaction temperature of the first fuel is lower than that of the second fuel. The first fuel tank 10 is connected to the first fuel line 12 configured to guide the first fuel to a supply destination (e.g., the engine 6 or the fuel cell 8), and the first fuel line 12 is provided with a pump 14 configured to pump the first fuel. The second fuel tank 20 is connected to the second fuel line 22 configured to guide the second fuel to a supply destination (e.g., the engine 6 or the fuel cell 8), and the second fuel line 22 is provided with a pump 24 configured to pump the second fuel.

The cold recovery facility 100 illustrated in each of FIGS. 2 to 7 further includes: a first circuit 32 configured to circulate the first medium; and a first expansion turbine 34, the first heat exchanger 36, a pump 38, a second heat exchanger 40, and the third heat exchanger 42, which are each provided on the first circuit 32.

The first expansion turbine 34 is configured to expand the first medium in gaseous state flowing through the first circuit 32. The first expansion turbine 34 is adapted to expand the first medium in gaseous state to recover rotational power of the turbine from the first medium.

In the illustrated exemplary embodiment, a generator 35 is connected to the first expansion turbine 34. The generator 35 is configured to generate electric power by being rotationally driven by energy recovered by the first expansion turbine 34.

The first heat exchanger 36 is provided downstream of the first expansion turbine 34 on the first circuit 32. The first heat exchanger 36 is configured to condense the first medium by exchanging heat between the first medium flowing through the first circuit 32 and the first fuel from the first fuel tank 10 flowing through the first fuel line 12. The first heat exchanger 36 is configured to vaporize the first fuel in liquid state by heat exchange with the first medium. The first fuel from the first fuel tank 10 flows into the first heat exchanger 36 in liquid state.

The pump 38 is provided on the first circuit 32 downstream of the first heat exchanger 36 and configured to boost the first medium condensed in the first heat exchanger 36.

The second heat exchanger 40 is provided on the first circuit 32 downstream of the pump 38. The second heat exchanger 40 is configured to exchange heat between the first medium flowing through the first circuit 32 and a heat medium (e.g., seawater or the like) supplied to the second heat exchanger 40 via a heat medium line 41 to evaporate the first medium in liquid state.

The third heat exchanger 42 is provided on the first circuit 32 downstream of the second heat exchanger 40 and upstream of the first expansion turbine 34. The third heat exchanger 42 is configured to exchange heat between the first medium flowing through the first circuit 32 and the second fuel from the second fuel tank 20 flowing through the second fuel line 22 to vaporize the second fuel in liquid state. The second fuel from the second fuel tank 20 flows into the third heat exchanger 42 in liquid state.

The first heat exchanger 36, the pump 38, the second heat exchanger 40 and the first expansion turbine 34, which are provided on the first circuit 32, form a first thermodynamic cycle 30 using the first medium as a working medium and the first fuel in liquid state as a low-temperature heat source in the first heat exchanger 36.

As the first medium, a fluid having a relatively low freezing point, which is difficult to freeze even after heat exchange with the first fuel in liquid state at a relatively low temperature, may be used. When the first fuel is hydrogen, for example, nitrogen (N2), argon (Ar), or the like may be used as the first medium.

The first fuel line 12 may be provided with a heater 16 configured to heat the first fuel. The first fuel vaporized in the first heat exchanger 36 may be heated to a suitable temperature in the heater 16, and then supplied to the engine 6 or the fuel cell 8 via the first fuel line 12. The second fuel line 22 may be provided with a heater 26 configured to heat the second fuel. The second fuel vaporized in the third heat exchanger 42 may be heated to a suitable temperature in the heater 26, and then supplied to the engine 6 or the fuel cell 8 via the second fuel line 22.

The heater 16 may be configured to heat the first fuel by heat exchange with a heat medium (e.g., seawater or the like) provided via a heat medium line 17. The heater 26 may be configured to heat the second fuel by heat exchange with a heat medium (e.g., seawater or the like) provided via a heat medium line 27.

In the above embodiment, the second fuel supplied to the third heat exchanger 42 provided between the second heat exchanger 40 and the first expansion turbine 34 in the first circuit 32 has a higher liquefaction temperature than the first fuel. Thus, in the first thermodynamic cycle 30, at the outlet of the third heat exchanger 42 where the first medium in gaseous state is cooled by heat exchange with the second fuel, the first medium can exist as a relatively high temperature gas (e.g., a temperature higher than that required to vaporize the first fuel). Consequently, since a heat drop (or a temperature differential of the first medium in gaseous state) between the inlet and outlet of the first expansion turbine 34 can be ensured, energy can be recovered by the first expansion turbine 34.

In the embodiment described above, the first fuel and the second fuel in liquid state are vaporized by heat exchange with the first medium in the first heat exchanger 36 and in the third heat exchanger 42 provided on the first circuit 32, respectively. Thus, one thermodynamic cycle (the first thermodynamic cycle 30) can be used to efficiently vaporize both liquid fuels of the first fuel and the second fuel.

Consequently, according to the embodiment described above, the cold energy of the liquid fuel can be recovered while efficiently vaporizing the two kinds of liquid fuels.

In some embodiments, for example, as illustrated in FIGS. 3 to 7, the cold recovery facility 100 is provided on the first circuit 32 downstream of the third heat exchanger 42 and upstream of the first expansion turbine 34 and includes a fourth heat exchanger 44 configured to heat the first medium. The fourth heat exchanger 44 may be configured to heat the first medium by heat exchange with a heat medium (e.g., seawater or the like) flowing through a heat medium line 45.

According to the embodiment described above, since the fourth heat exchanger 44 is provided, on the first circuit 32, configured to heat the first medium flowing upstream of the first expansion turbine 34, the temperature of the first medium at the inlet of the first expansion turbine 34 can be increased. Thus, the heat drop between the inlet and outlet of the first expansion turbine 34 can be increased, thereby increasing the output of the first expansion turbine 34.

Figure 4:
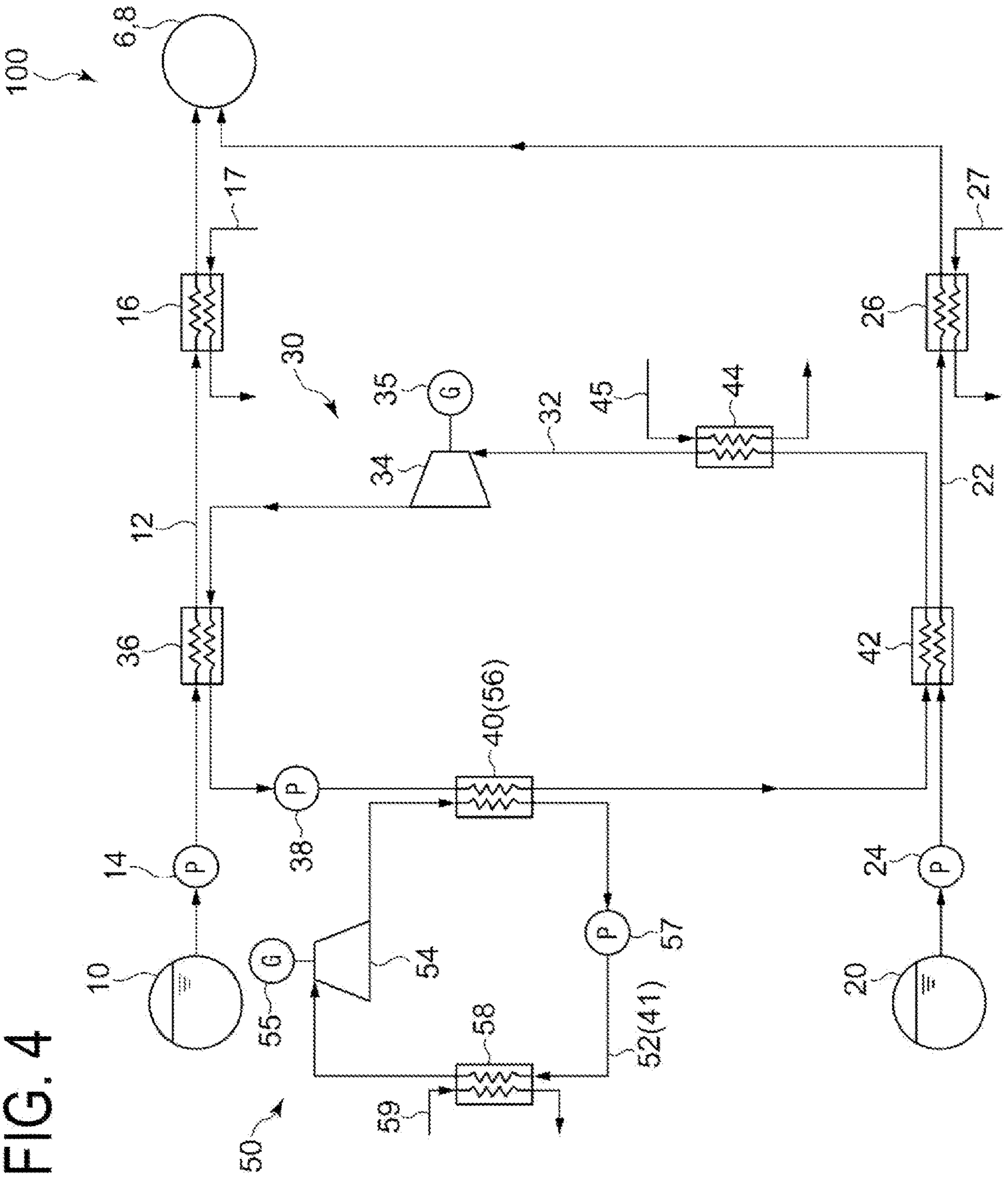
FIG. 4 is a schematic diagram of a cold recovery facility according to an embodiment.
Figure 5:
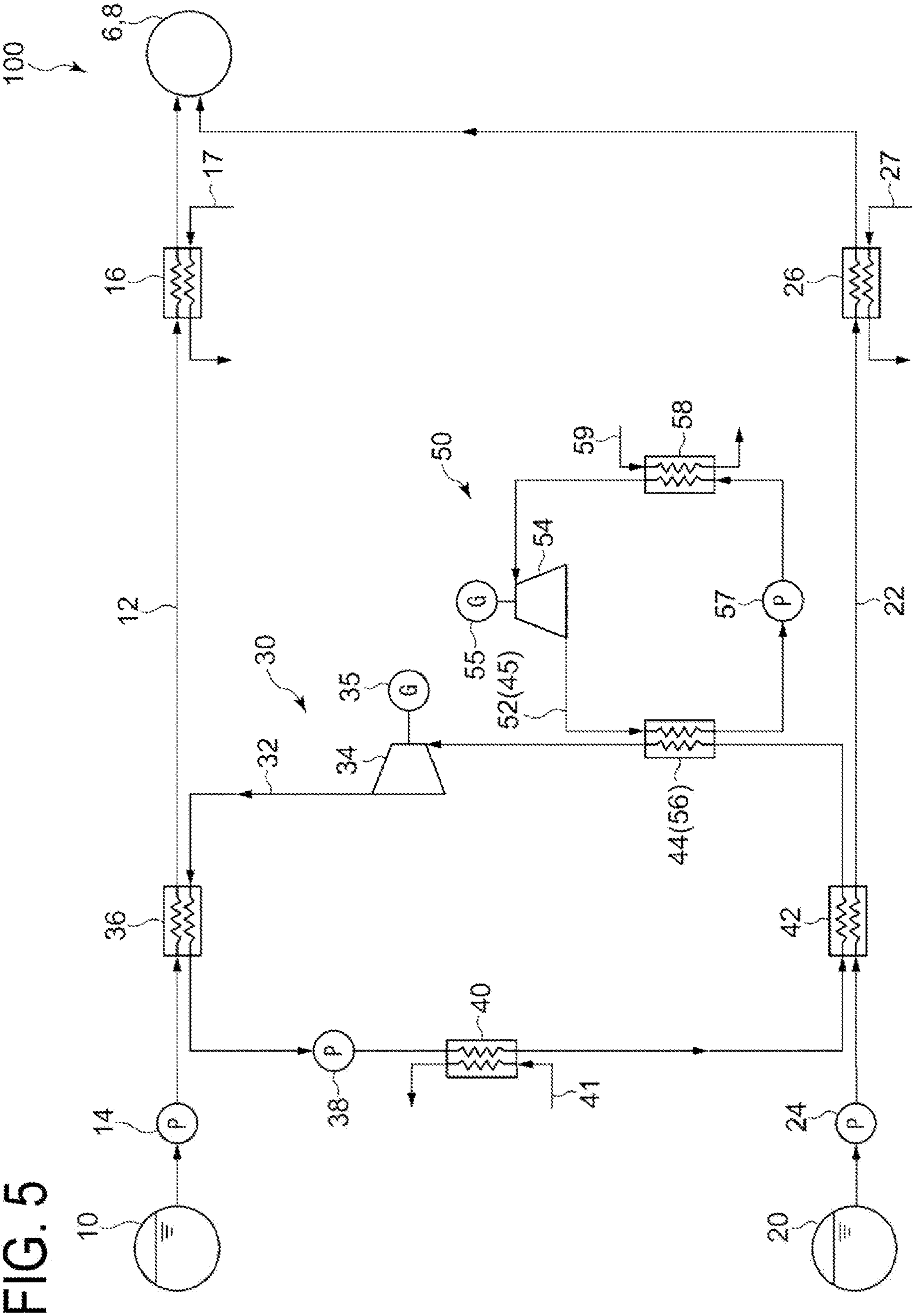
FIG. 5 is a schematic diagram of a cold recovery facility according to an embodiment.

In some embodiments, for example, as illustrated in FIGS. 4 and 5, the cold recovery facility 100 includes a second circuit 52 configured to circulate a second medium and a second expansion turbine 54 provided on the second circuit 52. The second expansion turbine 54 is configured to expand the second medium in gaseous state flowing through the second circuit, and forms a part of a thermodynamic cycle (second thermodynamic cycle 50) with the second circuit 52.

More specifically, the cold recovery facility 100 includes, on the second circuit 52, a condenser 56 (heat exchanger) provided downstream of the second expansion turbine 54, a pump 57 provided downstream of the condenser 56, and an evaporator 58 provided downstream of the pump 57 and upstream of the second expansion turbine 54. The condenser 56 is configured to condense the second medium in gaseous state, and the pump 57 is configured to boost the second medium in liquid state. The evaporator 58 is configured to evaporate the second medium in liquid state. The second thermodynamic cycle 50 is formed by these equipments.

In the illustrated exemplary embodiment, a generator 55 is connected to the second expansion turbine 54. The generator 55 is configured to generate electric power by being rotationally driven by energy recovered in the second expansion turbine 54.

The condenser 56 is configured to exchange heat between the first medium flowing through the first circuit 32 and the second medium flowing through the second circuit 52. That is, in the condenser 56, the second medium is condensed by heat exchange with the first medium. In the condenser 56, the first medium is heated by heat exchange with the second medium.

The evaporator 58 is configured to evaporate the second medium by heat exchange with a heat medium (e.g., seawater or the like) flowing through a heat medium line 59.

A fluid having a higher freezing point than that of the first medium can be used as the second medium. When the first medium is nitrogen or argon, a fluid (e.g., an organic refrigerant such as R1234zee) used as a working medium in a cold recovery cycle in a LNG carrier or the like in the related art can be used as the second medium.

According to the embodiment described above, the second circuit 52 and the second expansion turbine 54 form the second thermodynamic cycle 50 using the second medium as the working medium and the first medium having received cold heat from the first fuel in liquid state as the low-temperature heat source, and the second expansion turbine 54 is driven by the second medium in gaseous state. Consequently, the cold energy of the first fuel in liquid state can be further recovered. When the generators are each connected to the first expansion turbine 34 and the second expansion turbine 54, the power generating capacity can be increased.

In the embodiment described above, a fluid having a relatively low freezing point can be used as the second medium flowing through the second circuit 52. Consequently, freezing of the fluid in the heat exchanger (the condenser 56) configured to exchange heat between the first medium and the second medium can be suppressed. Thus, it is possible to suppress malfunction of the heat exchanger due to freezing of the fluid.

In the exemplary embodiment illustrated in FIG. 4, the second heat exchanger 40 configured to evaporate the first medium functions as a condenser 56 configured to condense the second medium.

In this embodiment, the first medium of the first thermodynamic cycle and the second medium of the second thermodynamic cycle 50 are heat exchanged in the second heat exchanger 40 (the condenser 56). Thus, the first thermodynamic cycle 30 using the second medium as a high-temperature heat source in the second heat exchanger 40 (the condenser 56) and the second thermodynamic cycle 50 using the first medium as a low-temperature heat source in the second heat exchanger 40 (the condenser 56) are efficiently driven to effectively recover the cold energy of the first fuel in liquid state.

In the exemplary embodiment illustrated in FIG. 5, the fourth heat exchanger 44 configured to raise the temperature of the first medium in gaseous state functions as a condenser 56 configured to condense the second medium.

In the first thermodynamic cycle 30, the first medium having received the cold heat of the second fuel in liquid state in the third heat exchanger 42, flows into the fourth heat exchanger 44. In this regard, in the embodiment described above, the first medium of the first thermodynamic cycle 30 and the second medium of the second thermodynamic cycle 50 are heat-exchanged in the fourth heat exchanger 44 (the condenser 56). Thus, the energy of the second fuel can also be recovered in the second thermodynamic cycle 50 that uses the first medium having received the cold heat of the second fuel as a low-temperature heat source. Further, in the fourth heat exchanger 44 (the condenser 56), the first medium flowing upstream of the first expansion turbine 34 on the first circuit 32 can be heated to raise the temperature. Thus, the heat drop between the inlet and outlet of the first expansion turbine 34 can be increased, thereby increasing the output of the first expansion turbine 34.

In some embodiments, an inert material (such as nitrogen or argon) as the first medium is configured to circulate through the first circuit 32. Then, for example, as illustrated in FIGS. 6 and 7, at least a part of the first medium (the first medium in a relatively high-pressure gaseous state) flowing on the first circuit 32 downstream of the second heat exchanger 40 and upstream of the first expansion turbine 34 is supplied to an inert gas utilizing equipment 60.

The inert gas utilizing equipment 60 may be an equipment other than the equipments (the first expansion turbine 34, and the heat exchangers such as the first heat exchanger 36) provided on the first circuit 32 and forming the first thermodynamic cycle 30.

Figure 6:
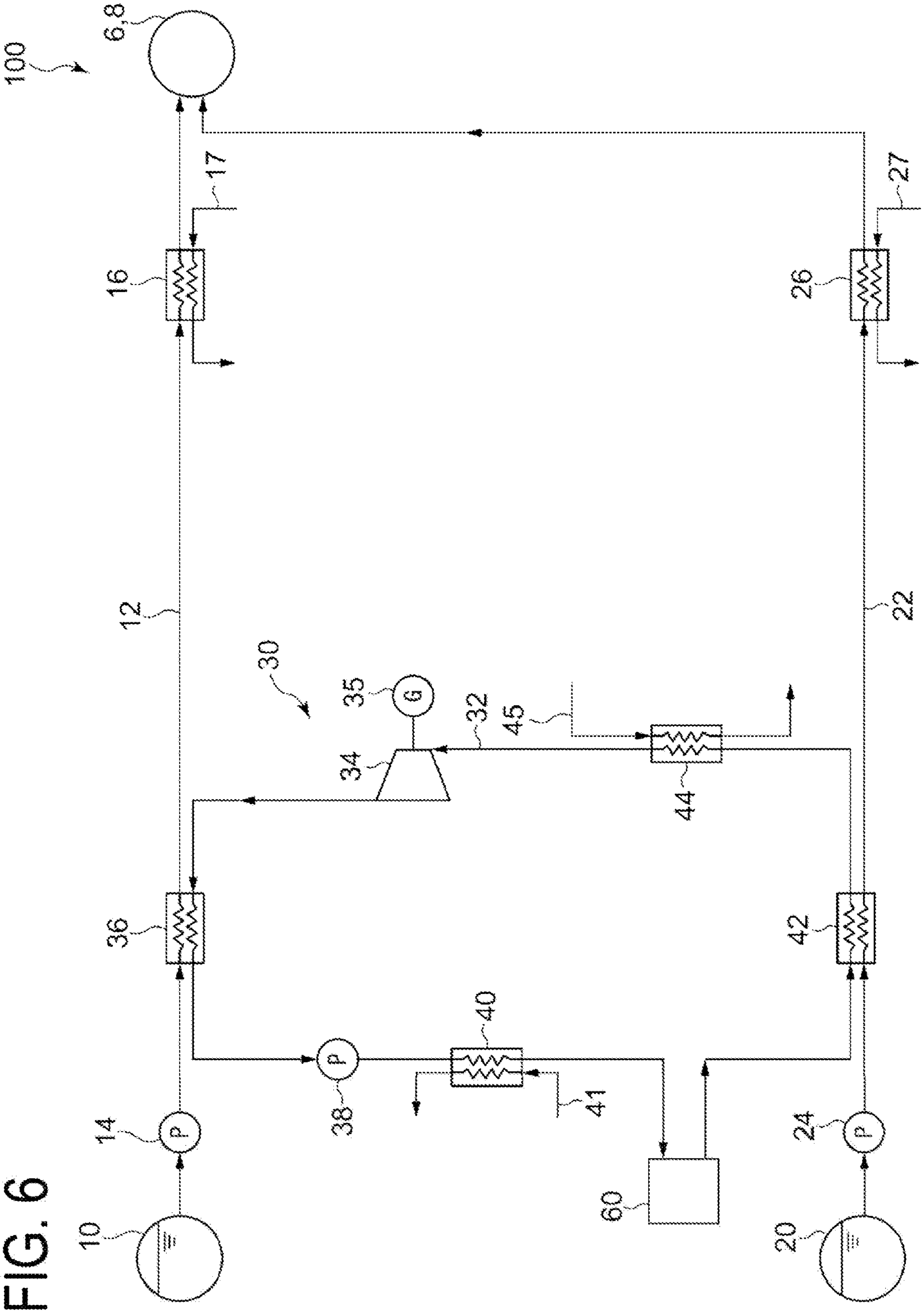
FIG. 6 is a schematic diagram of a cold recovery facility according to an embodiment.

In the exemplary embodiment illustrated in FIG. 6, the pipe forming the first circuit 32 is connected to the inert gas utilizing equipment 60, and the inert gas utilizing equipment 60 forms a part of circulation path (the first circuit 32) of the first medium.

Figure 7:
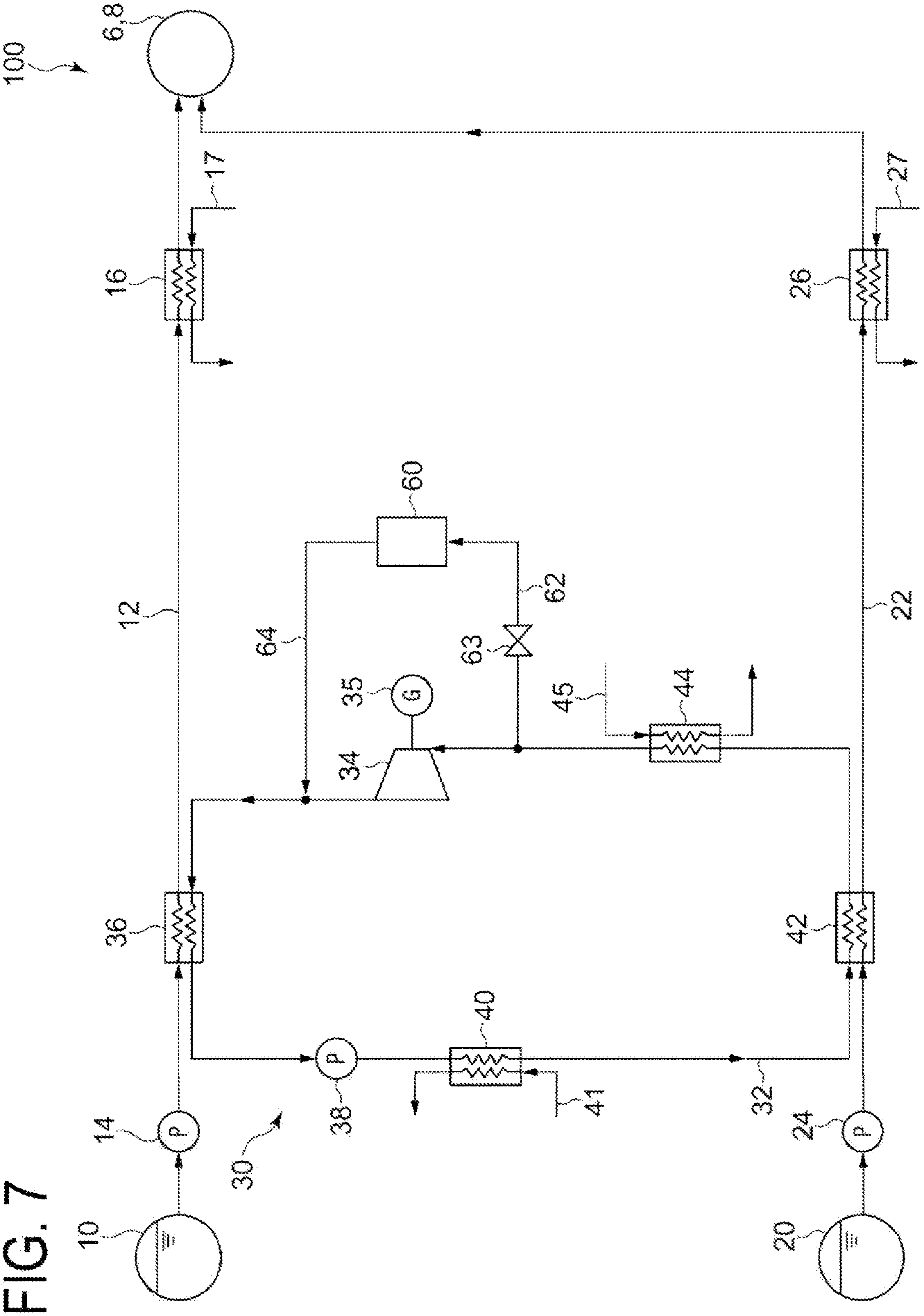
FIG. 7 is a schematic diagram of a cold recovery facility according to an embodiment.

In the exemplary embodiment illustrated in FIG. 7, the cold recovery facility 100 includes: a supply line 62, which is configured to branch from the first circuit 32 upstream of the first expansion turbine 34 and supply the first medium to the inert gas utilizing equipment 60; and a return line 64, which is configured to merge with the first circuit 32 downstream of the first expansion turbine 34 and return the first medium from the inert gas utilizing equipment 60 to the first circuit 32. As illustrated in FIG. 7, the supply line 62 may be provided with a valve 63 configured to adjust the amount of the first medium flowing through the supply line 62.

In the embodiment described above, an inert material is used as the first medium, and at least a part of the first medium (inert gas) in a relatively high-pressure gaseous state in the first circuit 32 is supplied to the inert gas utilizing equipment 60. In this manner, the first medium, which is an inert material, can be effectively utilized for a purpose other than the working medium.

The inert gas utilizing equipment 60 described above may be, for example, a gas transport pipe configured to transport a combustible gas. The gas transport pipe may have a double pipe structure including an inner peripheral side pipe configured to flow the combustible gas and an outer peripheral side pipe provided on the outer peripheral side of the inner peripheral side pipe. At least a part of the first medium flowing downstream of the second heat exchanger 40 and upstream of the first expansion turbine 34 on the first circuit 32 may be supplied to the outer peripheral side pipe of the gas transport pipe. The gas transport pipe may be a pipe constituting the first fuel line 12 or the second fuel line 22.

According to the embodiment described above, since the gas of the first medium (inert gas) that is an inert material is supplied to the outer peripheral side pipe of the gas transport pipe having the double pipe structure, even when the combustible gas leaks from the inner peripheral side pipe, the combustible gas is transported by the inert gas, so that the detection by the gas detector can be accelerated. Thus, the first working medium can be effectively used for quickly detecting gas leakage. The gas detector may include a sensor configured to detect the combustible gas in the outer peripheral side pipe.

In some embodiments, at least one of the heat exchangers provided on the first circuit 32 may be configured to exchange heat between the cooling fluid having cooled the high-temperature equipment and the first medium.

Figure 2:
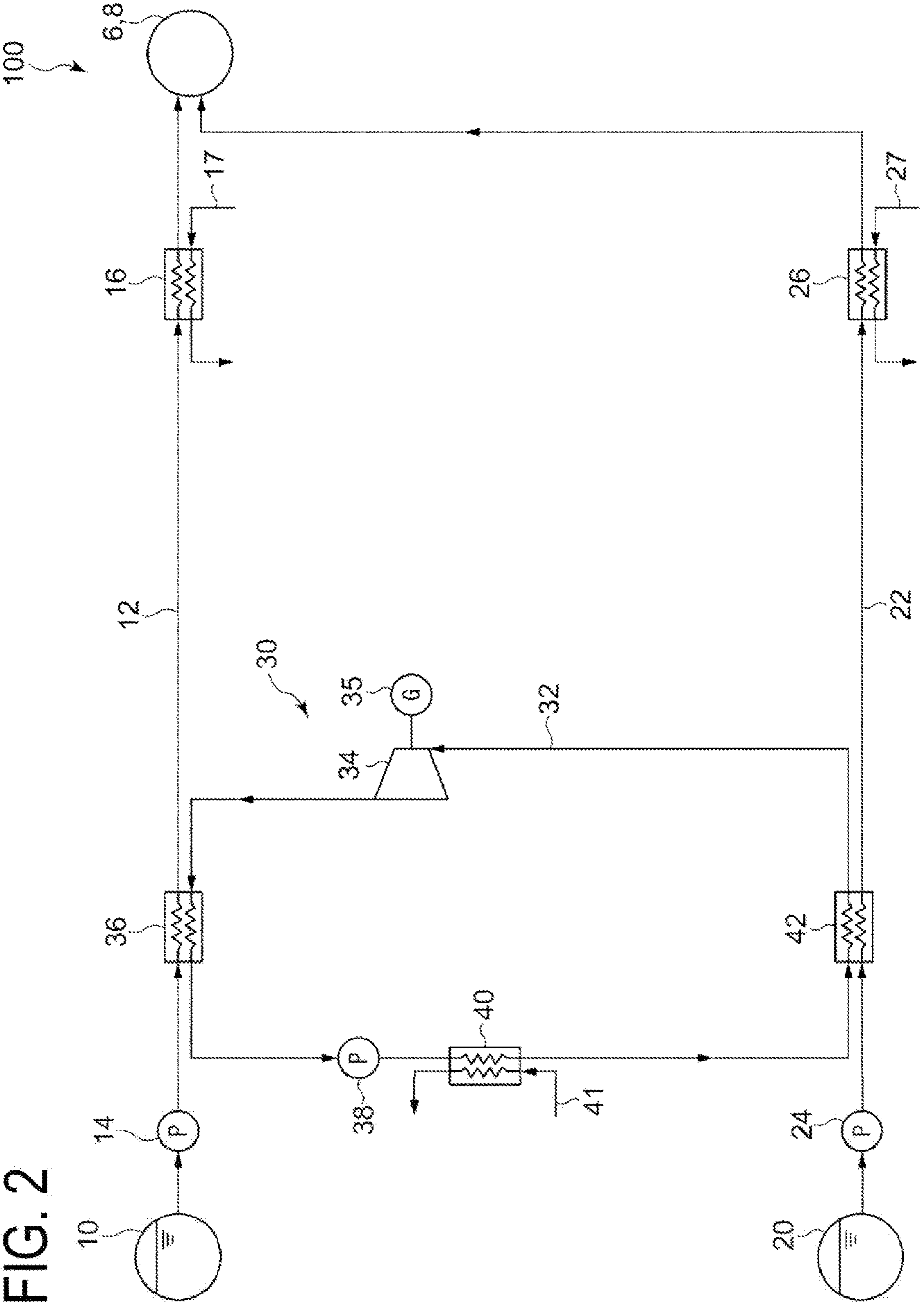
FIG. 2 is a schematic diagram of a cold recovery facility according to an embodiment.
Figure 3:
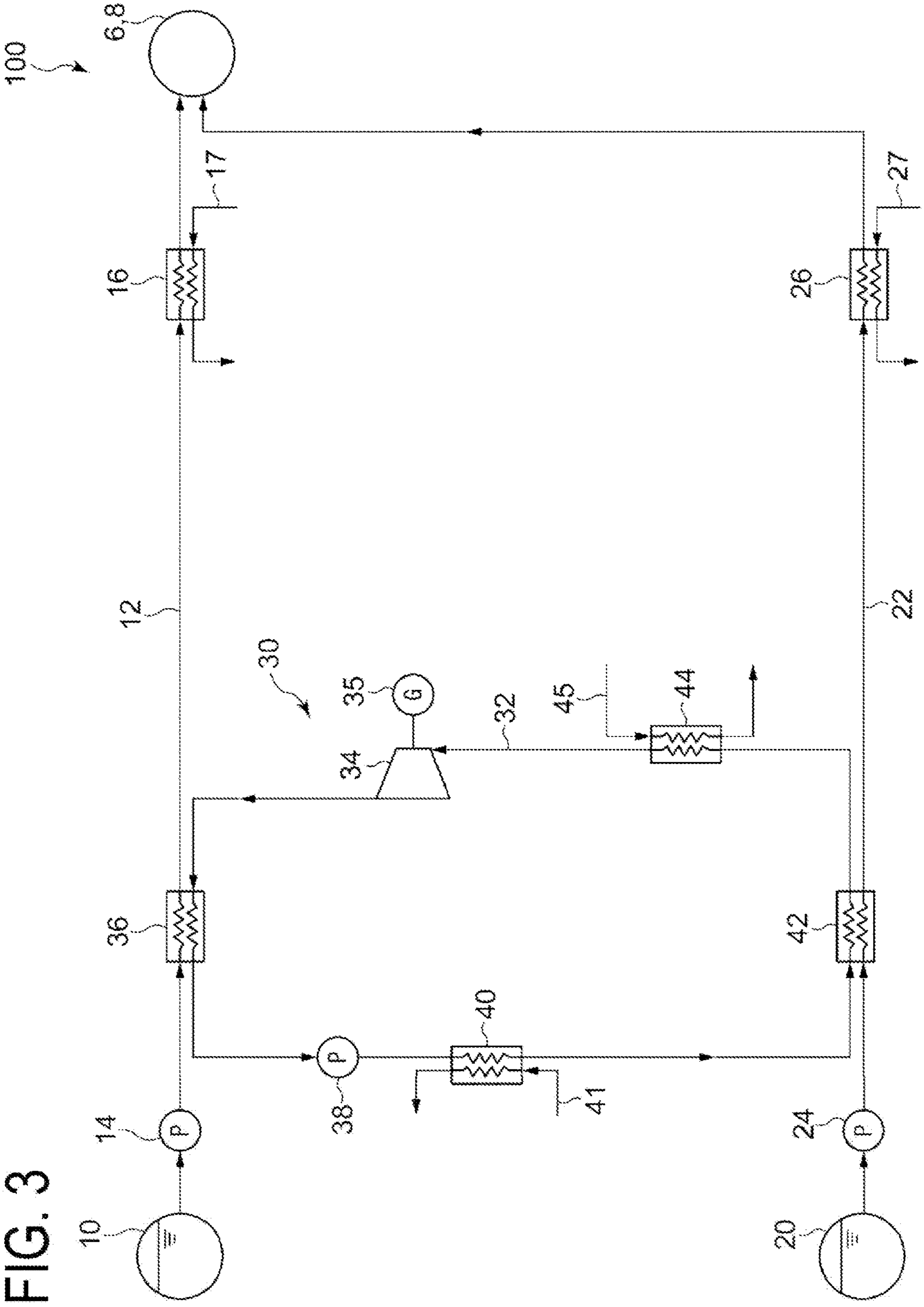
FIG. 3 is a schematic diagram of a cold recovery facility according to an embodiment.

For example, in the exemplary embodiment illustrated in FIGS. 2, 3 and to 7, the second heat exchanger 40 may be configured to exchange heat between the cooling fluid having cooled the high-temperature equipment and the first medium. That is, the heat medium supplied to the second heat exchanger 40 via the heat medium line 41 may include a cooling fluid (cooling water or cooling oil) after cooling the high-temperature equipment.

Alternatively, in the exemplary embodiments illustrated in FIGS. 3, 4, 6 and 7, the fourth heat exchanger 44 may be configured to exchange heat between the cooling fluid having cooled the high-temperature equipment and the first medium. That is, the heat medium supplied to the fourth heat exchanger 44 via the heat medium line 45 may include a cooling fluid (cooling water or cooling oil) after cooling the high-temperature equipment.

In the embodiment described above, the cooling fluid having cooled the high-temperature equipment is used as a heat source for heating the first medium. Consequently, by effectively utilizing the waste heat of the high-temperature equipment, the cold energy of the liquid fuel can be recovered while efficiently vaporizing the first fuel and the second fuel in liquid state.

Figure 8:
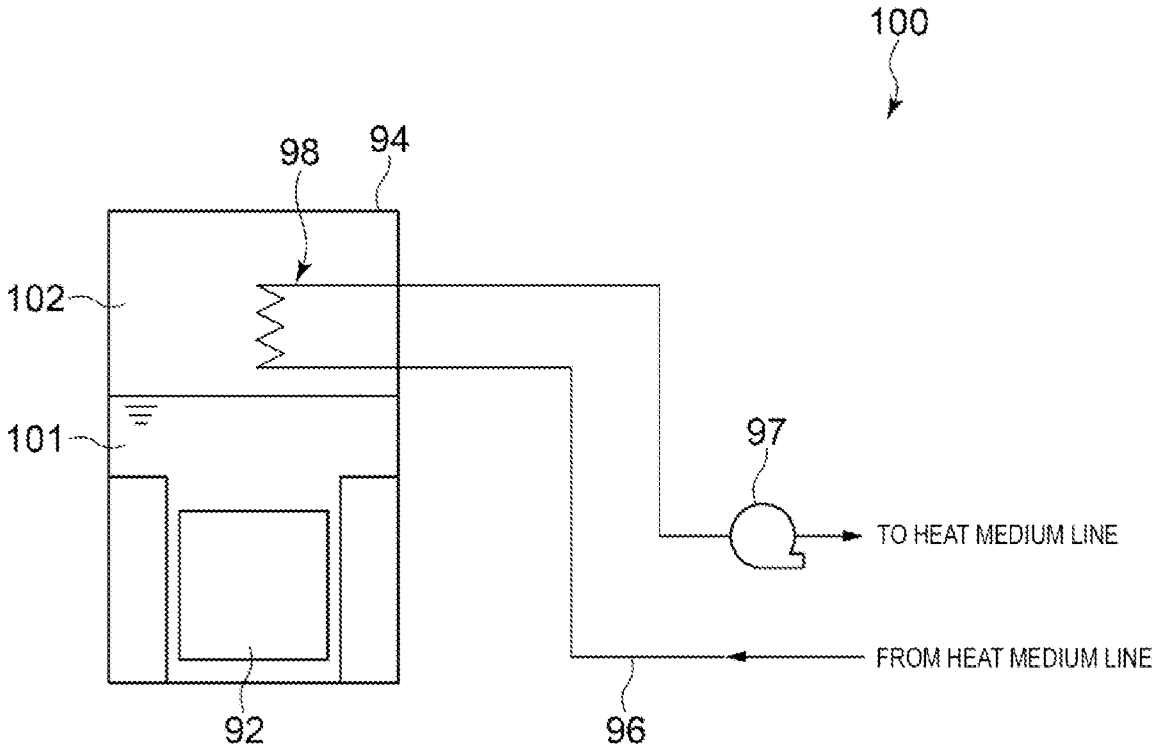
FIG. 8 is a schematic diagram of a calculator as an example of a high-temperature equipment.

The high-temperature equipment described above may include a calculator. FIG. 8 is a schematic diagram of a calculator as an example of a high-temperature equipment. A calculator 92 illustrated in FIG. 8 is an immersion server configured to be cooled by being immersed in a refrigerant oil 101 in liquid state.

The calculator 92 is installed in a liquid immersion chamber 94 in a state of being immersed in the refrigerant oil 101 in liquid state. In the liquid immersion chamber 94, a condenser 98 is provided above the refrigerant oil 101 in liquid state. The liquid immersion chamber 94 has a sealed structure in which the refrigerant oil 101 in liquid state and a refrigerant oil 102 in gaseous state coexists inside. A cooling fluid (such as cooling water or cooling oil) is supplied to the condenser 98 through a cooling fluid line 96. The cooling fluid line 96 is provided with a pump 97.

In the liquid immersion chamber 94, the refrigerant oil 101 in liquid state is vaporized by receiving heat from the calculator 92. The refrigerant oil 102 in gaseous state is cooled by the condenser 98 and liquefied. As the refrigerant oil is repeatedly vaporized and liquefied, heat from the calculator 92 is transferred to the cooling fluid via the refrigerant oil and the condenser 98 in the liquid immersion chamber 94. In this manner, the cooling fluid cools the calculator 92.

The cooling fluid discharged from the condenser 98 in the cooling fluid line 96 may be supplied to the second heat exchanger 40 or the fourth heat exchanger 44 via the heat medium line 41 or the heat medium line 45, respectively. The cooling fluid discharged from the second heat exchanger 40 or the fourth heat exchanger 44 after heat exchange may be supplied to the condenser 98 of the liquid immersion chamber 94 again via the cooling fluid line 96.

The calculator described above as a high-temperature equipment is not limited to the immersion server. In some embodiments, the calculator may be another known liquid-cooled calculator, such as a water-cooled calculator that cools the processor with water.

According to the embodiment described above, the cooling fluid having cooled the calculator 92 is used as a heat source for heating the first medium. Therefore, by effectively utilizing the waste heat of the high-temperature equipment, the cold energy of the liquid fuel can be recovered while efficiently vaporizing two kinds of liquid fuels (the first fuel and the second fuel).

Each of the contents described in the above embodiments is grasped as follows, for example.

(1) A cold recovery facility (100) according to at least one embodiment of the disclosure includes:

a first fuel tank (10) configured to store a first fuel in liquid state;

a second fuel tank (20) configured to store a second fuel in liquid state having a liquefaction temperature higher than the liquefaction temperature of the first fuel;

a first circuit (32) configured to circulate a first medium;

a first expansion turbine (34) provided on the first circuit and configured to expand the first medium in gaseous state;

a first heat exchanger (36) provided downstream of the first expansion turbine on the first circuit and configured to condense the first medium;

a pump (38) provided downstream of the first heat exchanger on the first circuit and configured to boost the first medium;

a second heat exchanger (40) provided downstream of the pump on the first circuit and configured to vaporize the first medium; and a third heat exchanger (42) provided downstream of the second heat exchanger and upstream of the first expansion turbine on the first circuit, wherein the first heat exchanger is configured to vaporize the first fuel by heat exchange between the first fuel in liquid state from the first fuel tank and the first medium, and the third heat exchanger is configured to vaporize the second fuel by heat exchange between the second fuel in liquid state from the second fuel tank and the first medium.

In the configuration of above (1), the first heat exchanger, the pump, the second heat exchanger and the first expansion turbine, which are provided on the first circuit, constitute a thermodynamic cycle (hereinafter, first thermodynamic cycle) using the first medium as a working medium and the first fuel in liquid state having a relatively low liquefaction temperature as a low-temperature heat source.

Here, the second fuel supplied to the third heat exchanger provided between the second heat exchanger and the first expansion turbine in the first circuit has a higher liquefaction temperature than the first fuel. Thus, in the thermodynamic cycle described above, at the outlet of the third heat exchanger where the first medium in gaseous state is cooled by heat exchange with the second fuel, the first medium can exist as a relatively hot (e.g., a temperature higher than that required to vaporize the first fuel) gas. Consequently, since a heat drop (or a temperature differential of the first medium in gaseous state) between the inlet and outlet of the first expansion turbine can be ensured, energy can be recovered by the first expansion turbine.

In the configuration of above (1), the first fuel and the second fuel in liquid state are vaporized by heat exchange with the first medium in the first heat exchanger and the third heat exchanger provided on the first circuit, respectively. Thus, one thermodynamic cycle can be used to efficiently vaporize both liquid fuels of the first fuel and the second fuel.

Consequently, according to the configuration of above (1), the cold energy of the liquid fuel can be recovered while efficiently vaporizing the two kinds of liquid fuels.

(2) In some embodiments, in the configuration of above (1), the cold recovery facility further includes a fourth heat exchanger (44) provided on the first circuit downstream of the third heat exchanger and upstream of the first expansion turbine and configured to heat the first medium.

According to the configuration of above (2), since the heat exchanger is provided, on the first circuit, configured to heat the first medium flowing upstream of the first expansion turbine, the temperature of the first medium at the inlet of the first expansion turbine can be raised. Thus, the heat drop between the inlet and outlet of the first expansion turbine can be increased, thereby increasing the output of the first expansion turbine.

(3) In some embodiments, in the configuration of above (1) or (2), the cold recovery facility further includes:

a second circuit (52) configured to circulate a second medium;

a second expansion turbine (54) provided on the second circuit to form a part of a thermodynamic cycle with the second circuit and configured to expand the second medium in gaseous state; and a heat exchanger (e.g., the second heat exchanger 40 or the fourth heat exchanger 44) provided on the first circuit and configured to heat the first medium by heat exchange with the second medium.

According to the configuration of above (3), the second circuit and the second expansion turbine form a second thermodynamic cycle (hereinafter, second thermodynamic cycle) using the second medium as the working medium and the first medium having received cold heat from the first fuel in liquid state as the low-temperature heat source, and the second expansion turbine is driven by the second medium in gaseous state. Consequently, the cold energy of the first fuel in liquid state can be further recovered.

In the configuration of above (3), a fluid having a relatively low freezing point can be used as the second medium flowing through the second circuit. Consequently, freezing of the fluid in the heat exchanger configured to exchange heat between the first medium and the second medium can be suppressed.

(4) In some embodiments, in the configuration of above (3), the heat exchanger includes the second heat exchanger (40).

In the configuration of above (4), the first medium of the first thermodynamic cycle and the second medium of the second thermodynamic cycle are heat exchanged at the second heat exchanger (the heat exchanger). Thus, the first thermodynamic cycle using the second medium as a high-temperature heat source in the second heat exchanger and the second thermodynamic cycle using the first medium as a low-temperature heat source in the second heat exchanger are efficiently driven to effectively recover the cold energy of the first fuel in liquid state.

(5) In some embodiments, in the configuration of above (3), the cold recovery facility further includes a fourth heat exchanger (44) provided, on the first circuit, downstream of the third heat exchanger and upstream of the first expansion turbine and configured to heat the first medium, and the heat exchanger includes the fourth heat exchanger.

The first medium having received the cold heat of the second fuel in liquid state in the third heat exchanger flows into the fourth heat exchanger. In this regard, in the configuration of above (5), the first medium of the first thermodynamic cycle and the second medium of the second thermodynamic cycle are heat exchanged in the fourth heat exchanger (the heat exchanger). Thus, the energy of the second fuel can also be recovered by the second thermodynamic cycle that uses the first medium having received the cold heat of the second fuel, as a low-temperature heat source. Further, in the fourth heat exchanger, the first medium flowing upstream of the first expansion turbine on the first circuit can be heated to raise the temperature. Thus, the heat drop between the inlet and outlet of the first expansion turbine can be raised, thereby increasing the output of the first expansion turbine.

(6) In some embodiments, in the configuration of any one of above (1) to (5), the cold recovery facility further includes a heat exchanger (e.g., the second heat exchanger 40 or the fourth heat exchanger 44) provided on the first circuit and configured to heat the first medium by heat exchange with a cooling fluid having cooled a high-temperature equipment.

In the configuration of above (6), the cooling fluid having cooled the high-temperature equipment is used as a heat source configured to heat the first medium. Thus, by effectively utilizing the waste heat of the high-temperature equipment, as described in above (1), the cold energy of the liquid fuel can be recovered while efficiently vaporizing two kinds of liquid fuels.

(7) In some embodiments, in the configuration of above (6), the high-temperature equipment includes a calculator (92).

According to the configuration of above (7), the cooling fluid having cooled the calculator is used as a heat source configured to heat the first medium. Thus, by effectively utilizing the waste heat of the high-temperature equipment, the cold energy of the liquid fuel can be recovered while efficiently vaporizing two kinds of liquid fuels.

(8) In some embodiments, in the configuration of any one of above (1) to (7), the cold recovery facility further includes a first generator (35) configured to be driven by the first expansion turbine.

According to the configuration of above (8), the first generator can be driven by the first expansion turbine forming the first thermodynamic cycle. Thus, the two kinds of liquid fuels can be efficiently vaporized while driving the first generator by using the cold energy of the first fuel in liquid state.

(9) In some embodiments, in the configuration of any one of above (1) to (8), an inert material as the first medium is configured to circulate through the first circuit, and at least a part of the first medium flowing downstream of the second heat exchanger and upstream of the first expansion turbine on the first circuit is configured to be supplied to an inert gas utilizing equipment (60).

According to the configuration of above (9), an inert material is used as the first medium, and at least a part of the first medium (inert gas) in a relatively high-pressure gaseous state in the first circuit is supplied to the inert gas utilizing equipment. In this manner, the first medium, which is an inert material, can be effectively utilized for a purpose other than the working medium.

(10) In some embodiments, in the configuration of above (9), the cold recovery facility further includes a gas transport pipe, as the inert gas utilizing equipment, configured to transport the combustible gas, the gas transport pipe has a double pipe structure including:

an inner peripheral side pipe configured to flow the combustible gas; and an outer peripheral side pipe provided outerward of the inner peripheral side pipe, and the outer peripheral side pipe is configured to supply the at least a part of the first medium.

According to the configuration of above (10), since the gas (inert gas) of the first medium which is an inert material is supplied to the outer peripheral side pipe of the gas transport pipe having the double pipe structure, even when the combustible gas leaks from the inner peripheral side pipe, the combustible gas is transported by the inert gas, so that the detection by the gas detector can be accelerated. Thus, the first medium can be effectively used for quickly detecting gas leakage.

(11) A marine vessel (1) according to at least one embodiment of the disclosure includes:

a hull (2);

a cold recovery facility (100) described in any one of above (1) to (10) provided in the hull; and an engine (6) or a fuel cell (7) using, as fuels, the first fuel vaporized in the first heat exchanger and the second fuel vaporized in the third heat exchanger.

According to the configuration of above (11), the first heat exchanger, the pump, the second heat exchanger, and the first expansion turbine, which are provided on the first circuit, constitute a thermodynamic cycle (hereinafter, first thermodynamic cycle) using the first medium as a working medium and the first fuel in liquid state having a relatively low liquefaction temperature as a low-temperature heat source.

Here, the second fuel supplied to the third heat exchanger provided between the second heat exchanger and the first expansion turbine in the first circuit has a higher liquefaction temperature than the first fuel. Thus, in the thermodynamic cycle described above, even when the first medium is condensed by heat exchange with the first fuel in liquid state, pumped, vaporized in the second heat exchanger, and cooled by heat exchange with the second fuel in liquid state in the third heat exchanger, the first medium can be maintained in gaseous state. Consequently, since the first medium in gaseous state flows into the first expansion turbine, energy can be recovered in the first expansion turbine.

In the configuration of above (11), the first fuel and the second fuel in liquid state are vaporized by heat exchange with the first medium in the first heat exchanger and the third heat exchanger provided on the first circuit, respectively. Thus, one thermodynamic cycle can be used to efficiently vaporize both liquid fuels of the first fuel and the second fuel.

Consequently, according to the configuration of above (11), the cold energy of the liquid fuel can be recovered while efficiently vaporizing the two kinds of liquid fuels.

Although the embodiments of the disclosure have been described above, the disclosure is not limited to the above-described embodiments, and also includes modifications of the above-described embodiments as well as appropriate combinations of the embodiments.

In the present specification, an expression of relative or absolute arrangement such as "in a direction", "along a direction", "parallel", "orthogonal", "centered", "concentric" or "coaxial" shall not be construed as indicating only the arrangement in a strict literal sense, but also as indicating a state where the arrangement is relatively displaced by a tolerance, or by an angle or a distance that can still achieve the same function.

For example, expressions indicating a state of being equal such as "same," "equal," or "uniform" shall not be construed as indicating only a state of being strictly equal, but also as indicating a state where there is a tolerance or a difference that can still achieve the same function.

In addition, in the present specification, an expression of a shape such as a rectangular shape or a cylindrical shape shall not be construed as indicating only a geometrically strict shape, but also as indicating a shape with unevenness or chamfered corners or the like within the range in which the same effect can be achieved.

In addition, in the present specification, an expression such as "comprising", "including", or "having" one component is not intended to be exclusive of other components.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A cold recovery facility comprising:

a first fuel tank configured to store a first fuel in liquid state;

a second fuel tank configured to store a second fuel in liquid state having a liquefaction temperature higher than the liquefaction temperature of the first fuel;

a first circuit configured to circulate a first medium;

a first expansion turbine provided on the first circuit and configured to expand the first medium in gaseous state;

a first heat exchanger provided downstream of the first expansion turbine on the first circuit and configured to condense the first medium;

a pump provided downstream of the first heat exchanger on the first circuit and configured to boost the first medium;

a second heat exchanger provided downstream of the pump on the first circuit and configured to vaporize the first medium; and a third heat exchanger provided downstream of the second heat exchanger and upstream of the first expansion turbine on the first circuit, wherein the first heat exchanger is configured to vaporize the first fuel by heat exchange between the first fuel in liquid state from the first fuel tank and the first medium, and the third heat exchanger is configured to vaporize the second fuel by heat exchange between the second fuel in liquid state from the second fuel tank and the first medium.

2. The cold recovery facility according to claim 1, further comprising a fourth heat exchanger provided on the first circuit downstream of the third heat exchanger and upstream of the first expansion turbine and configured to heat the first medium.

3. The cold recovery facility according to claim 1, further comprising:

a second circuit configured to circulate a second medium;

a second expansion turbine provided on the second circuit to form a part of a thermodynamic cycle with the second circuit and configured to expand the second medium in gaseous state; and a heat exchanger provided on the first circuit and configured to heat the first medium by heat exchange with the second medium.

4. The cold recovery facility according to claim 3, wherein the heat exchanger comprises the second heat exchanger.

5. The cold recovery facility according to claim 3, further comprising a fourth heat exchanger provided, on the first circuit, downstream of the third heat exchanger and upstream of the first expansion turbine and configured to heat the first medium, wherein the heat exchanger comprises the fourth heat exchanger.

6. The cold recovery facility according to claim 1, further comprising a heat exchanger provided on the first circuit and configured to heat the first medium by heat exchange with a cooling fluid having cooled a high-temperature equipment.

7. The cold recovery facility according to claim 6, wherein the high-temperature equipment includes a calculator.

8. The cold recovery facility according to claim 1, further comprising a first generator configured to be driven by the first expansion turbine.

9. The cold recovery facility according to claim 1, wherein an inert material as the first medium is configured to circulate through the first circuit, and at least a part of the first medium flowing downstream of the second heat exchanger and upstream of the first expansion turbine on the first circuit is configured to be supplied to an inert gas utilizing equipment.

10. A marine vessel comprising:

a hull;

a cold recovery facility described in claim 1 provided in the hull; and an engine or a fuel cell using, as fuels, the first fuel vaporized in the first heat exchanger and the second fuel vaporized in the third heat exchanger.

* * * * *